United States Patent [19]

Wrench

[11] Patent Number: 4,740,329
[45] Date of Patent: Apr. 26, 1988

[54] DISPERSING AGENTS FOR COAL SLURRIES

[75] Inventor: Eric Wrench, Fordham, England

[73] Assignee: Witton Chemical Company Limited, Mildenhall, England

[21] Appl. No.: 38,151

[22] Filed: Apr. 14, 1987

[30] Foreign Application Priority Data

Nov. 20, 1984 [GB] United Kingdom ................ 8429289

[51] Int. Cl.⁴ ............................................. B01J 13/00
[52] U.S. Cl. ................................... 252/312; 252/356; 44/51; 524/69
[58] Field of Search .................... 252/312, 356; 44/51; 524/69; 526/317.1, 318.4, 318.42, 287

[56] References Cited

U.S. PATENT DOCUMENTS

| 3,019,059 | 1/1962 | McMurtrie . | |
|---|---|---|---|
| 3,524,682 | 8/1970 | Booth . | |
| 3,956,122 | 5/1976 | Coscia et al. | 210/734 |
| 4,004,072 | 1/1977 | Tamura | 526/317.1 X |
| 4,081,418 | 3/1978 | Barua et al. | 526/317.1 X |
| 4,217,109 | 8/1980 | Siwersson et al. . | |
| 4,242,098 | 12/1980 | Braun et al. | 44/51 |
| 4,314,044 | 2/1982 | Hughes et al. | 526/317.1 X |
| 4,330,301 | 5/1982 | Yamamura et al. . | |
| 4,358,293 | 11/1982 | Mark . | |
| 4,370,429 | 1/1983 | Clarke et al. . | |

FOREIGN PATENT DOCUMENTS

| 00500 | 2/1983 | European Pat. Off. . | |
|---|---|---|---|
| 00501 | 2/1983 | European Pat. Off. . | |
| 0089766 | 9/1983 | European Pat. Off. . | |
| 0092353 | 10/1983 | European Pat. Off. . | |
| 03617 | 10/1983 | European Pat. Off. . | |
| 04044 | 11/1983 | European Pat. Off. . | |
| 04045 | 11/1983 | European Pat. Off. . | |
| 04046 | 11/1983 | European Pat. Off. . | |
| 174509 | 3/1986 | European Pat. Off. | 252/309 |
| 2167434 | 5/1986 | United Kingdom | 252/312 |

Primary Examiner—Matthew A. Thexton
Attorney, Agent, or Firm—Frishauf, Holtz, Goodman & Woodward

[57] ABSTRACT

A slurry of coal particles in water includes as a dispersing agent a copolymer of acrylonitrile or methacrylonitrile with an acrylate or methacrylate compound wherein the copolymer has a molecular weight below 80,000 and comprises:
(a) from 10 to 80% by weight of acrylonitrile or methacrylonitrile, and
(b) 20 to 90% by weight of acrylic acid or methacrylic acid or an alkali metal, ammonium or amine salt thereof.

5 Claims, 2 Drawing Sheets

DISPERSING AGENTS FOR COAL SLURRIES

BACKGROUND OF THE INVENTION

This invention relates to dispersing agents, and to coal slurries containing such dispersing agents. More particularly, the invention relates to dispersing agents comprising copolymers of acrylonitrile or methacrylonitrile with acrylic acid or methacrylic acid, or salts of these acids.

In recent years there has been increasing interest in the manufacture of high solids coal/water slurries which have good stability during transit and storage, but which can be readily burned as a substitute for heavy fuel oil in various applications. The coal should be as fine as possible, so that it burns rapidly and completely, and the slurry must be sufficiently fluid to flow under gravity or when pumped. It should not deposit sediment, nor should clear water separate at the top surface, when the slurry is stored for any length of time.

In recent years, there has been increasing interest in the long distance transport of coal by pumping a slurry of coal particles in water through a pipeline. The first Patent for the transport of coal in water dates back to 1891, and a short pipeline was operated as long ago as 1914. Since the 1950's several pipelines having lengths exceeding 150 kilometers have been constructed and are in operation.

To ensure ease of transport, it has been necessary to pay careful attention to the particle size distribution of the solids, and to employ various dispersing agents to ensure that the particles remain distributed in the aqueous phase. Some quite complex grinding and grading procedures have been suggested (see WO No. 83/04046), but there are practical and economic difficulties in applying such techniques upon a large scale.

A number of different types of dispersing agent have been proposed. One type comprises half ethers or half esters or polyoxyalkylene glycols, either along (WO No. 83/04044) or U.S. Pat. No. 4,358,293) or in association with ionic surface active agents, such as polyoxyalkylene derivatives of sulfosubstituted or quaternary ammonium-substituted phenols (WO No. 83/04045).

Another approach has been to make the surface of coal particles mutually repulsive by the addition of Zwitterionic amphiphiles, such as lecithin or alkyl betains (see WO Nos. 83/03617 and 03618). These materials can also be associated with polyalkylene oxides (see WO No. 83/00500).

Various types of sulphonates have been employed, including lignin and humic (EP-A-0089766, EP-A-0092353, EP-A-0050412, EP-A-0065259, U.S. Pat. No. 3,019,059, U.S. Pat. No. 4,330,301.

The use of polyacrylates has been disclosed in U.S. Pat. No. 4,217,109 and WO No. 83/00501 and acrylate/acrylamide copolymers have been disclosed in U.S. Pat. No. 4,370,429.

There is still, however, a need for effective dispersing agents, since in practice it has not been found possible to manufacture and store coal slurries having concentrations much exceeding 45 to 55% by weight, without the addition of a dispersant. Such slurries would not be suitable as fuels, without needing further treatment, since they comprise too much water and not enough coal.

In U.S. Pat. No. 3,524,682 there is described a polyelectrolyte for use in the pumping of coal slurries. This polyelectrolyte may comprise polymers of acrylonitrile or acrylic acid or copolymers thereof: optionally with small amounts of further monomers. The said polyelectrolyte must have a molecular weight of at least 100,000. When this polyelectrolyte is added to coal slurries it forms a suspension with a solids content of up to 60% of coal particles.

The coal slurries formed in this way become free-flowing only when pumped at high pressure and at high velocities. The slurry reverts to a suspension when static.

Such suspensions are of little use where gravity feed of a slurry which has a high solid content of coal is required, such as in coal-fired power generating plant.

SUMMARY OF THE INVENTION

We have now found that coal solids higher than 60% can be gravity fed, by using as a dispersant a particular copolymer polyelectrolyte, and if the molecular weight of that copolymer polyelectrolyte is substantially reduced, i.e. to a maximum of 80,000 and preferably to a value of 600 to 8000. Such a dispersing agent maintains sufficient fluidity to flow under gravity with up to 80% solids, although values of 68–70% are often preferred for economic reasons. According, therefore, to a first feature of the invention there is provided a dispersing agent for a slurry of coal particles in water, said dispersing agent comprising a copolymer of acrylonitrile or methacrylonitrile with an acrylate or methacrylate compound, said copolymer having a molecular weight below 80,000, and being formed from (a) from 10 to 80% by weight of acrylonitrile or methacrylonitrile, and (b) from 20 to 90% by weight of acrylic acid or methacrylic acid or an alkali metal, ammonium or amine salt thereof.

According to a second aspect of the present invention there is provided a composition comprising a slurry of coal particles in water, which composition additionally comprises as a dispersing agent a copolymer of acrylonitrile or methacrylonitrile withan acrylate of methacrylate compound wherein the copolymer has a molecular weight of below 80,000 and comprises (a) from 10 to 80% by weight of acrylonitrile or methacrylonitrile, and (b) from 20 to 90% by weight of acrylic acid or methacrylic acid or an alkali metal, ammonium or amine salt thereof.

According to a third feature of the present invention there is provided a method of stabilising a slurry of up to 80% by weight of coal particles in water which comprises incorporated therein 0.1 to 5% by weight of a dispersing agent comprising a copolymer formed from (a) 10 to 80% by weight of acrylonitrile or methacrylonitrile, and (b) from 20 to 90% by weight of acrylic acid or methacrylic acid or an alkali metal, ammonium ]or amine salt thereof said dispersing agent having a molecular weight below 80,000.

Optionally, minor amounts of other comonomers (e.g. up to 5% by weight) may be incorporated with the monomers listed above. Such other monomers include:

acrylic acid esters
methacrylic acid esters
2-hydroxyethyl methacrylate and similar monomers
propylene clycol monoethacrylate and similar monomers 2-sulphoethyl methacrylate and similar monomers,
including AMPS (2-acrylamido 2-methylpropane sulphonic acid and its salts)
esters of versatic acid (Veova monomers)
half ester of maleic acid and similar products
vinyl sulphonic acid and its salts.

The molecular weight of the copolymers does not appear to have a critical effect upon their dispersant activity, and it has been found that polymers with molecular weights from 600 to 8000 have good activity, with a preferred molecular weight around 2000, although much higher molecular weights, e.g. up to about 80,000 have useful dispersant activities.

The unit derived from acrylic or methacrylic acid in the final product, can be used in acidic form or in salt form. Examples of such salts are the alkali metal salts (e.g. sodium or potassium), or the ammonium salts. The latter are preferred because of their volatility on combustion. This avoids the production of corrosive solid combustion products which could arise from the combustion of coal in the presence of the alkali metal form of the dispersing agent. In addition to ash from the coal itself, alkali metal salts would produce additional ash, which would lower the fusion temperature of the coal ash.

As indicated above, the amounts of monomer (a) are from 10 to 80% and those of monomer (b) are from 20 to 90% by weight, ie. the weight ratio (a):(b) is 80:20 to 10:90. It has been found that the most preferred weight ratio is around 35:65.

The polymers constituting the dispersing agents according to the invention can be produced by conventional polymerization techniques. A preferred technique, however, which results in the production of the polymer in a particularly convenient form, involves polymerization of the monomers (a) and (b), and optionally the additional minor comonomer, under relatively dilute conditions in an aqueous medium. In an especially preferred technique, a mixture of monomers with appropriate chain modifiers can be run into a large volume of water, and an initiator can be run into the water at the same time. This results in precipitation of the copolymer as it is formed. Addition rates should be slow, in order to ensure that the acrylonitrile remains in solution, (it has a solubility of about 7% in water).

The form of the precipitated polymer varies according to the ratios of the monomers. High contents of the acid monomer (b) result in translucent glutinous lumps of a gel. A high content of the acrylonitrile monomer (a), on the other hand, provides an opaque light fluffy precipitate, which is conveniently separated from the aqueous medium. For use, the monomer can be digested in an appropriate ammoniacal solution to provide the preferred ammonium form of the copolymers.

Latex polymerization in the presence of emulsifiers leads to some problems in polymerization, giving products which are not completely soluble in bases. Solution polymerization also leads to problems, insofar as the product (neutralized polymer salt) is not easily separated from the solvents which are effective for the acrylonitrile copolymers (dimethyl formamide, dimethyl sulphoxide and tetrahydrofuran).

Polymers produced by the process described above, can be employed for the production of coal slurries containing 60 to 80% by weight of coal particles in water. The particle size of the coal can, for example, by 75 μm or less.

It is well known that coal occurs in many forms, whose characteristics differ vary considerably (eg. anthracite, bituminous, sub-bituminous, lignite, etc.). The dispersing agents according to the invention can be used with any of these, they can conveniently be used for the formation of slurries from bituminous coal.

The amounts of dispersing agent added can, for example, range from 0.1 to 5% by weight, based on dry coal.

It is an advantage of the invention that the dispersing agents can be used by themselves, without the need for an additional anti-settling agent. They can, however, be used as a supplement to conventional dispersing agents such as alkali metal silicates or alkali metal humates. Dispersions produced using the dispersing agents according to the present invention, alone or in admixture with conventional dispersing agents, exhibit enhanced rheological stability as compared with dispersions prepared using the conventional dispersing agents by themselves. By "rheological stability", we mean the property of remaining in a fluid condition without settlement of the solid, or separation of a substantial quantity of liquid on the surface of the slurry.

DETAILED DESCRIPTION

Test Procedure for Coal Dispersants

Figure 1:
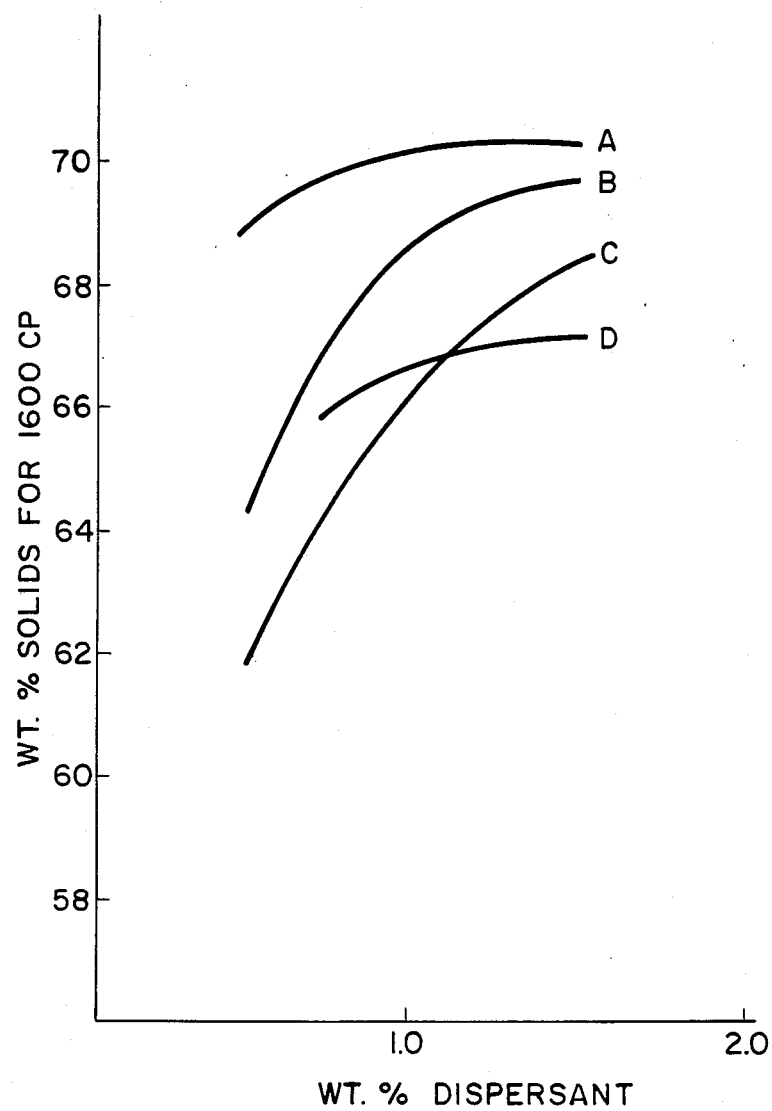

Coal is ground and suspended by a two-stage process, which comprises the successive steps of grinding coal under conditions which subject the coal particles to both a crushing and a shearing action, and mixing the ground coal with water and a dispersing agent to form a mixture containing from 60 to 80% by weight of ground coal.

A suitable apparatus for grinding coal under the specified conditions is that which is generally known as a pan crusher as described in "Chemical Engineers' Handbook", 5th edition, by Robert H Perry and Cecil H Chilton, McGraw-Hill Book Company, New York, 1973, pages 8-24 and 8-25. The apparatus generally comprises a pan in which one or more rollers revolve. A pan crusher in which the rollers revolve about horizontal axes is generally known as an "edge runner" and similar apparatus in which the rollers revolve about vertical axes is generally known as an "end runner".

Before treatment in the pan crusher, the coal may be subjected to one or more other comminution steps. For example, it may first be crushed in a jaw or gyratory crusher and may then, in addition, be subjected to wet grinding, for example in a ball or pebble mill.

For some purposes it may also be advantageous to subject the coal to one or more process steps to remove substantially all of the noncombustible inorganic impurities which would form ash on combustion of the coal. A froth flotation process may advantageously be used for this purpose and most preferably a hydrocarbonaceous liquid is used as the collector reagent for the coal and an alkali metal silicate is used as a depressant for the siliceous and clayey ash impurities.

Preferably the coal is subjected to grinding in a pan crusher in a form such that it can, for example, be handled by shovelling or pouring down a chute, but also such that it is still sufficiently plastic to form coherent lumps. A suitable plastic mixture containing 20 to 30% by weight of water may be formed by dewatering a coal water suspension which has been subjected to preliminary process steps in the wet state. The dewatering is preferably performed in a tube pressure filter of the type described in GB-A-1240465, preferably operated at a pressure differential of 1000 to 1500 psi (6.89 to 10.34 MPa). The ground coal is mixed with sufficient water containg a dispersing agent to form a mixture containing from 60 to 80% by weight, and preferably at least 70% by weight, of coal.

A quantity of wet coal of known moisture content containing 125 grams of dry powdered coal is weighed out. The dispersant to be tested is placed in a 300 ml beaker with sufficient distilled water to provide a coal/-water slurry having a solids content of approximately 73% by weight. The entire quantity of coal is stirred into the water by hand in order to form a stiff dilatent paste. Additional water may be necessary to allow all the coal to be incorporated.

The mixture is transferred to a 200 ml standard mixing vessel and stirred for 25,000 revolutions. The temperature rises by 25°±3° C. during this mixing and the liquid is then cooled to a temperature of 22°±1° C. Its viscosity is then measured with a Brookfield RVTD viscometer at 100 rpm using spindle 5. If the mixture is too viscous to give a reading, distilled water is added until a suitable consistency is attained. When the viscosity is around 2800 MPa.s, water is added in two stages to give a final viscosity of 1600 MPa.s, the solids content and viscosity being measured at each addition. A graph is then plotted of log (viscosity) against the weight percentage of solids. The appropriate solids content for a viscosity of 1600 MPa.s is determined by interpolation.

Preparation of Dispersing Agents

Three dispersing agents were prepared having the following compositions, in terms of monomers (in % by weight).

| Product | Acrylic acid | Acrylonitrile | Average Molecular Weight |
| --- | --- | --- | --- |
| I | 50 | 50 | 1550 |
| II | 60 | 40 | 1400 |
| III | 65 | 35 | 1100 |

The final products were solution polymers in water in the form of ammonium salts.

The method of polymerisation consisted of running the mixture of monomers and chain modifiers into a large volume of water and running in an initiator at the same time. This resulted in the copolymer being precipitated as it was formed. Addition rates were sufficiently slow to ensure all the acrylonitrile was in solution. (It has a solubility of about 7% in water). The form of the precipitate varied according to the monomer ratio. High acrylic acid contents gave translucent glutinous lumps of gel . High acrylonitrile contents gave opaque light fluffy precipitates.

After completion of polymerisation a small excess of ammonia was added and the mixture was boiled down to give a clear solution of 30 to 40% by weight solids. Generally speaking the solids content was near to 40% by weight.

The invention will now be further described in the following non-limitative Examples which are given by way of illustration.

EXAMPLE 1

150 g of dry bituminous coal as wet pan milled material was mixed with sufficient water and 1.5% by weight of dispersant I to give an approximately 73% by weight solids slurry. The coal was finer than 75 μm with 30% by weight smaller than 2 μm. It was transferred to a mixer having a three-bladed propeller type impeller and stirred at 1420 rpm for a total of 25,000 revolutions. The temperature increased from 22° C. to 47° C. during the mixing. The slurry was then cooled and its viscosity was measured at different solids concentrations, achieved by successive dilutions with water to include 1600 MPa.s. Interpolation showed that a slurry of 69.5 wt % solids content showed a viscosity of 1600 MPa.s. The pH of the slurry was 7.5. The slurry was stable over a period of 3 days and showed no appreciable sedimentation of coarser particles or appearance of clear liquid on the surface.

The results of tests on two further dispersants are given below.

| Dispersant | Dose Rate | Temperature increase on mixing (°C.) | pH of slurry | Solids content (% by weight) for 1600 MPa.s. |
| --- | --- | --- | --- | --- |
| II | 1.5% | 28° | 6.8 | 68.1 |
| III | 1.5% | 27° | 6.4 | 67.0 |

Further results are shown graphically in FIG. 1 of the accompanying Drawings, in which the weight percent of solids required to produce a slurry of viscosity 1600 cP is plotted against weight percent dispersant as follows:
Curve A Dispersant I
Curve B Dispersant I
Curve C Dispersant II
Curve D Dispersant III

EXAMPLE 2

Figure 2:
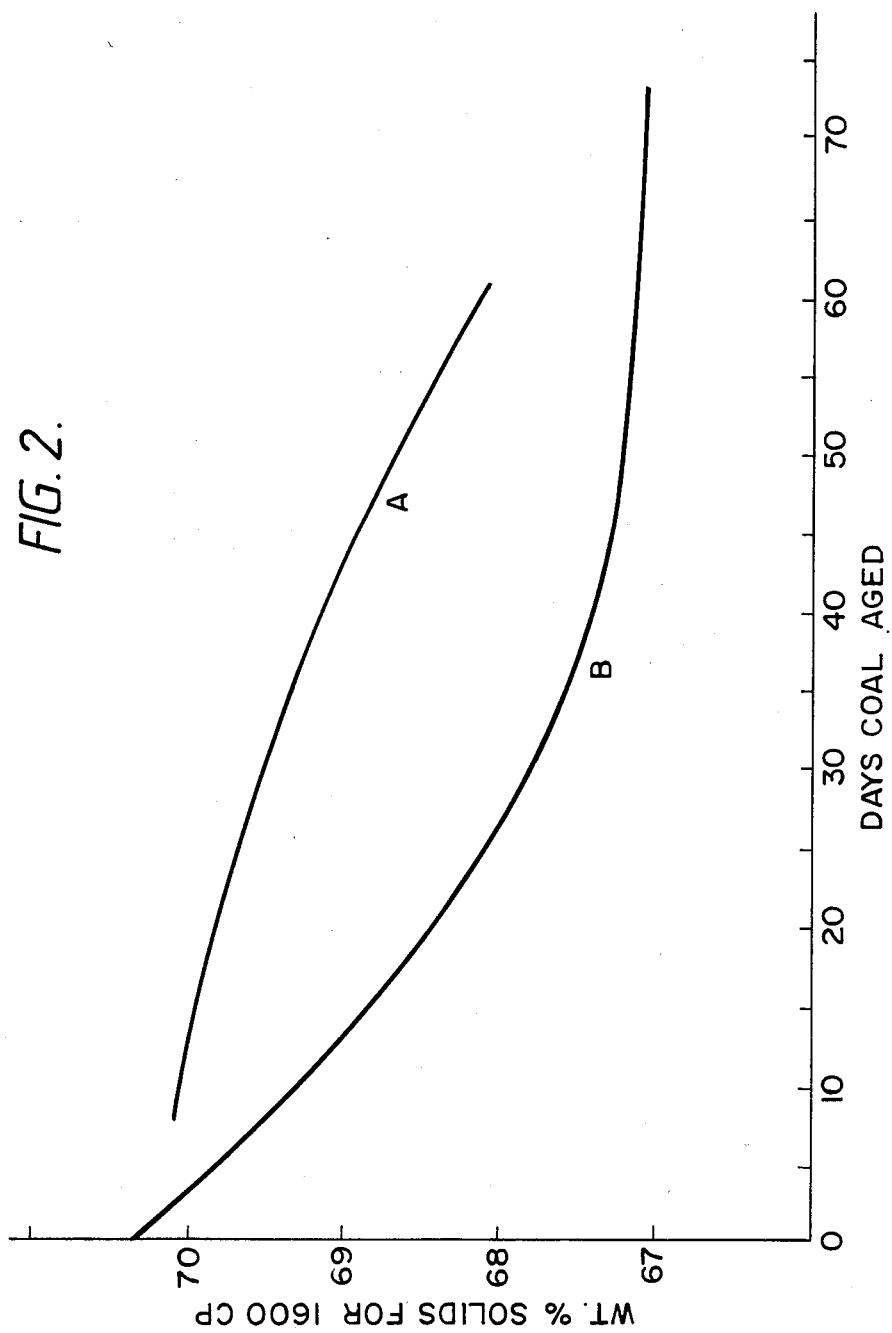

FIG. 2 of the accompanying drawings shows the effects of preparing, with the aid of various dispersants, deflocculated aqueous suspensions of ground bituminous coal which has been allowed to stand in sealed bags in filter cake form for different lengths of time.

A bituminous coal graded to minus 50 mm was crushed to approximately minus 6 mm in a jaw crusher. The crushed coal was then mixed with sufficient water to form a slurry containing 50 to 55% by weight of coal and was ground with steel balls in a ball mill until the product consisted predominantly of particles smaller than a No. 200 mesh B.S. sieve (nominal aperture 75 μm).

The slurry of ground coal was then diluted with water to 20% by weight of solids and fed to a hydrocyclone which had been set up to give a cut point of approximately 75 μm. The oversize material was returned to the ball mill and the suspension of undersize coal particles was passed at a solids content of approximately 18% by weight to a froth flotation plant where it was subjected to froth flotation, using pine oil as a collector for the coal and sodium silicant as a depressant for the siliceous ash material.

The froth product, comprising a suspension of substantially ash-free coal of particle size smaller than 75 μm was then thickened by gravity in a raked tank. The thickened underflow from the tank at a solids content of 25% by weight was then fed to a battery of tube pressure filters of the type described in GB-A-1240465 operated at a pressure differential of 10.35 MPa. The tube pressure filters discharged cake which was dry and non-sticky to the touch and contained 25% by weight of water.

Samples of this cake were placed in sealed bags, and after different lengths of time, were tested for dispersibility by weighing out a quantity of cake equivalent to 150 g of dry coal, mixing with it 1.5% by weight, based on the weight of dry coal, of a dispersant, and a small quantity of water sufficient to form a stiff paste, and subjecting the paste thus formed to stirring at 1420 rpm for a total of 25,000 revolutions in a mixer as used in Example 1. The solids content of a suspension of the deflocculated coal suspension having a viscosity of 1600 MPa.s. was then determined by the technique described in Example 1.

The results are set forth in FIG. 2, in which the weight percent solids required to produce a slurry of viscosity 1600 cP, is plotted against time in days for which coal was aged. Curve A shows the performance of Dispersant I, Curve B shows the performance of a 1.5% by weight solution of Dolaflux H.

EXAMPLE 3

The action of the dispersing agents used according to the invention was compared with that of a conventionally-employed dispersing agent.

A bituminous coal was processed in the same way as that described in Example 2 above and samples of tube pressure filter cake containing 25% by weight of water were obtained.

Samples of this cake were tested for dispersibility and rheological stability by weighing out a quantity of cake equivalent to 150 g of dry coal, mixing it with 1.5% by weight, based on the weight of dry coal, of a dispersing agent or mixture of dispersing agents and a small quantity of water sufficient to form a stiff paste and subjecting the paste thus formed to stirring in mixer as used in Example 1 at 1420 rpm for a total of 25,000 revolutions. The solids content of a suspension of the deflocculated coal suspension having a viscosity of 1600 MPa.s. was then determined by the technique described in Example 1.

In each case, the suspension was then allowed to stand for 1 month, at the end of which time the amount of sediment deposited on the bottom of the container was assessed. The results are shown in the following Table.

The dispersing agent systems consisted of mixtures in different proportions of Dispersing Agent I and "DOLAFLUX H" (a dispersing agent containing sodium humates and formed by the alkali extraction of lignite).

TABLE

| Dispersing Agent System | Temperature increase on mixing (°C.) | Wt. % Solids content for 1600 MPa.s. | Amount of sediment after 1 month |
|---|---|---|---|
| 100% D-1 | 14 | 68.9 | None |
| 75% D-I/ 25% DOLAFLUX | 16 | 68.7 | None |
| 50% D-I/ 50% DOLAFLUX | 16 | 68.7 | Very small amount |
| 100% DOLAFLUX | 17 | 68.6 | Large amount |

D-1 = Dispersing agent-I (see above).

These results show that all four suspensions showed substantially the same solids concentration for a viscosity of 1600 MPa.s but that better rheological stability was achieved with higher doses of D-I.

I claim:

1. A composition comprising a slurry of coal particles in water which composition additionally comprises as a dispersing agent a copolymer of acrylonitrile or methacrylonitrile with an acrylate or methacrylate compound wherein the copolymer has a molecular weight below 80,000 and comprises;
   (a) from 10 to 80% by weight of acrylonitrile or methacrylonitrile, and
   (b) from 20 to 90% by weight of acrylic acid of methacrylic acid or an alkali metal, ammonium or amine salt thereof.

2. A composition according to claim 1 wherein the copolymer comprises up to 5% by weight of additional co-monomer or co-monomers selected from as ester of acrylic or methacrylic acid with a monohydric alcohol, a half ester of acrylic or methacrylic acid with a dihydric alcohol, a sulphoalkyl ester or amide of acrylic or methacrylic acid, an ester of versatic acid or a half ester of an unsaturated dicarboxylic acid or vinyl sulphonic acid.

3. A composition according to claim 1 wherein the copolymer has a molecular weight of 600 to 8,000, is present in an amount of 0.1 to 5% by weight, and wherein the slurry comprises 60 to 80% of coal particles.

4. A method of stabilising a slurry of up to 80% by weight of coal particles in water which comprises incorporating therein 0.1 to 5% by weight of a dispersing agent comprising a copolymer formed from
   (a) 10 to 80% by weight of acrylonitrile or methacrylonitrile and
   (b) from 20 to 90% by weight of acrylic acid or methacrylic acid or an alkali metal, ammonium or amine salt thereof and having a molecular weight below 80,000.

5. A method according to claim 4 wherein the polymer has a molecular weight of 600 to 8,000 and is added at a rate of 0.1 to 5% by weight to a slurry comprising 60 to 80% by weight of coal particles.

* * * * *